Patented Oct. 17, 1950

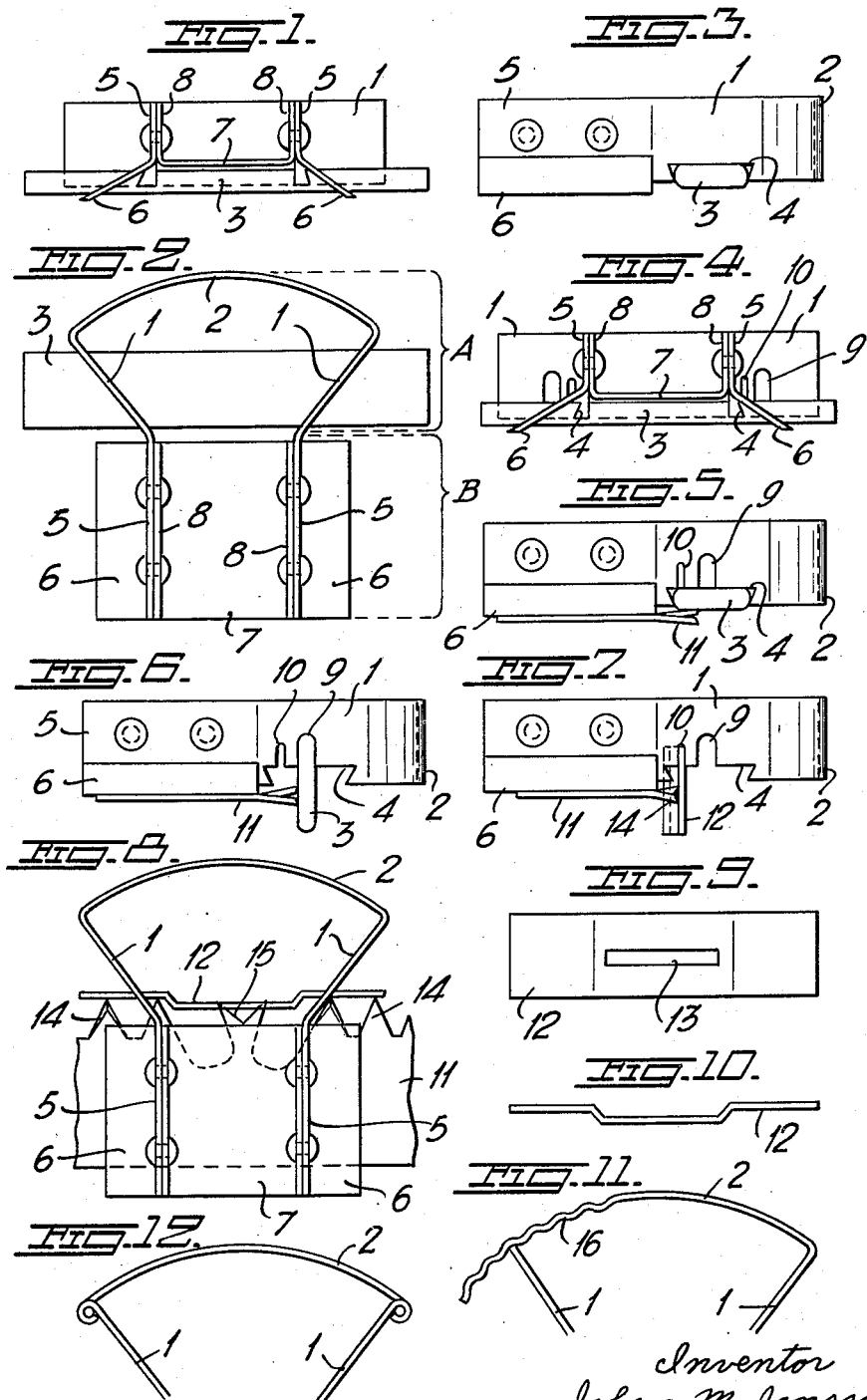

2,526,364

UNITED STATES PATENT OFFICE 2,526,364

SIDE SHARPENING DEVICE FOR SAW TEETH

Johan Martin Jonsson, Woxna, Sweden

Application May 5, 1948, Serial No. 25,292
In Sweden September 9, 1946

12 Claims. (Cl. 76—46)

The present invention relates to means for filing or grinding the side surfaces of set teeth of a saw blade with a view to obtaining plane guiding surfaces thereon which are parallel with the plane side surfaces of the saw blade and located at a given distance therefrom. By this means the points and cutting edges of the teeth are caused to cut into the wood along parallel planes representing the side surfaces of the saw-notch, which are perpendicular to the bottom of the notch, as distinguished from the operation of ordinary saw teeth set in the usual way which cut obliquely into the wood so that only the points of the teeth determine and work the side surfaces of the saw notch.

With teeth having plane side surfaces formed by filing or grinding the sides of the teeth after setting, the cutting through of a given piece of wood may be considerably accelerated and, as an additional advantage, the frequent filing of the teeth which is required in case of ordinarily set teeth may be avoided, since it is sufficient in order to sharpen the teeth when required, to slightly refile the sides of the teeth.

The object of the invention is to provide an implement by means of which the side filing or grinding of saw teeth may be easily effected in a way to ensure an accurate parallelism between the side surfaces of the teeth and those of the saw blade and an exact distance therebetween too.

The implement according to the invention comprises, mainly, a holding member, a file or an equivalent sharpening element and a handle for said holding member.

According to a feature of the invention the holder for the file or sharpening element consists of a pair of flexible arms projecting from the handle which are formed with recesses to receive the file or sharpening element and hold it under the influence of their flexibility.

According to another feature of the invention the handle is provided with a pair of guiding elements adapted in the use of the implement to slide along a plane side surface of the saw blade in order to define the parallelism and the distance between said surface and the plane surfaces to be formed on the respective side of the saw teeth.

These and other features of the invention may more nearly appear from the following description of a pair of preferred embodiments of the invention which are illustrated in the accompanying drawing.

In the drawing:

Fig. 1 is an end view of one constructional form of the implement according to the invention; Fig. 2 is a plan view of this embodiment, and Fig. 3 is a side elevation, looking from the right of Fig. 1 or 2.

Fig. 4 is an end view of the second embodiment, and Fig. 5 is a side elevation thereof looking from the right of Fig. 4 with a file in position for effecting a side sharpening operation. Fig. 6 is a view similar to Fig. 5, but with the file in position for adjusting the points of the teeth, and Fig. 7 is a view similar to Figs. 5 and 6, but with a gauge in position for adjusting the height of dust removing teeth of saw blades having such teeth arranged alternately with the cutting teeth proper. Fig. 8 is a plan view of of the implement with a gauge inserted therein. Fig. 9 is a plan view and Fig. 10 is a side elevation of a gauge. Figs. 11 and 12 show modified types of holding members.

The embodiment shown in Figs. 1–3 comprises a resilient section, designated as a whole by the reference character A, Fig. 2, and a rigid portion, designated as a whole by the reference character B, Fig. 2. The resilient section A forms a holder for the file or grinding element, while the rigid section B forms a handle and guide member. The resilient section A comprises a pair of arms 1 diverging from each other looking from the section B, said arms being connected at their ends remote from the handle by means of a preferably arc-shaped flexible member 2 which may be formed integrally with the arms, as shown in Fig. 2, the arms 1 and their connecting piece 2 being made from a blade spring material. To enable the arms to receive and clamp a file 3 or an equivalent grinding element, each arm is formed with a preferably dove-tailed notch 4 in one edge, hereinafter referred to as its lower edge. At their ends next to the handle section B the arms are formed with parallel extensions 5 of a larger width than that of the arms so as to form wings 6 at their lower edges. Said wings are bent obliquely outwardly and downwardly, as shown in Fig. 1. In order that the extensions 5 with their wings 6 may form a rigid handle, a U-shaped member 7 is inserted between the extensions 5 and connected thereto with their upstanding flanges 8, as by riveting or screws. By varying the angle of the wings 6 the distance between their lower edges and the lower surface of a file 3 or similar grinding element held by the arms 1 may be varied for a purpose which will be evident from the remainder of the specification.

When the implement is to be used for filing or grinding the sides of the teeth or a saw blade, the saw blade is placed on a working table or another suitable support. With one hand I grasp the implement by its handle portion and place it on the saw blade so that the wings 6 rest on the plane surface of the blade, while the file 3 or other equivalent grinding element inserted in the notches 4, as shown, bears against the teeth of the blade. By reciprocating the implement in the longitudinal direction of the saw blade the file is caused to work on the side surface of the teeth to grind plane surfaces thereof, until the wings bear against the saw blade with their entire lower edges. At this moment the surfaces as filed on the teeth are quite parallel with the respective side surface of saw blade and located at a distance therefrom which is equal to the distance between the lower edges of the wings and the operating surface of the file.

Then the saw blade is turned upside down to allow filing the other side of the teeth in the way described.

In this way the saw teeth obtain plane guide surfaces to engage the sides of the saw-notch as cut by the edges of the teeth, said edges lying in the same plane as said guide surfaces so that the teeth work the sides of the notch by their entire cutting portions and not only by their tips, as is usually the case, thereby considerably accelerating the cutting through of the wood. To sharpen the teeth it is sufficient to slightly file the side surfaces of the teeth in the way already described. This operation may be repeated until the side surfaces of the set teeth come to lie in the same plane as the side surfaces of the saw blade.

The embodiment shown in Figs. 4–8 differs from that above described by the feature that the arms 1 are provided with added notches 9 and 10 extending from the bottom of notch 4 at right angles thereto. Notch 9 is adapted to receive the file 3 when it is desired to adjust the points of the teeth, as shown in Fig. 6, and notch 10 is adapted to receive a gauge 12 when it is desired to adjust the height of saw-dust removing teeth of a saw blade having such teeth alternately with the cutting teeth proper, as shown in Figs. 7 and 8. The notch 4 is adapted to receive a file 3 for side sharpening purposes, as shown in Fig. 5, that is to say, in the way already described in connection with Figs. 1–3.

In adjusting the points of the saw teeth proper (Fig. 6) or the saw dust removing teeth the saw blade may be held in a saw sharpener's bench in well known way.

When the implement is used for adjusting the height of the saw-dust teeth of a saw blade having such teeth arranged alternately with cutting teeth it is preferred to use a gauge of the design shown in Figs. 9 and 10 said gauge comprising a rectangular metallic plate 12 having a depressed intermediate portion and a longitudinally extending slot 13 in said depressed portion. Said gauge is inserted with its end portions into the notches 10 of the arms 1 so that the depressed portion is facing the handle of the implement. In operation, the implement is placed against the saw blade 11, Fig. 8, so that the elevated ends of the gauge rest on cutting teeth 14 on opposite sides of a set of saw-dust removing teeth 15, with the points of said teeth 15 projecting through slot 13. The projecting points of the teeth 15 may then be shortened by filing or grinding them in well known way.

In Fig. 11 is shown a modified holding device, in which the arc-shaped portion 2 is formed integrally with one arm 1 and engages the end of the other arm 1 by means of corrugations, as shown at 16.

As a further modification the arc-shaped portion 2 may comprise a separate member pivotally connected to the ends of arms 1.

What I claim is:

1. A holder for saw tooth sharpeners comprising in combination a sheet of metal having a plane upper surface, two side members arranged at right angles thereto, the edge portions of said side members being bent outwards to form suitable grips for the fingers of an operator and the free edges of which serve as limiting guides for limiting abrasion of the saw teeth when the entire extent of the said free edges have come into engagement with a side of a saw being sharpened, flexible arms attached to said side members and projecting therefrom in diverging directions, said arms having recesses formed in their lower longitudinal edges for receiving a flat grinding element and clamping it under the action of the flexibility of the arms.

2. A holder as claimed in claim 1, and in which the flexible arms are connected at their ends remote from the handle by means of an arc-shaped flexible member.

3. A holder as claimed in claim 2, and in which the arc-shaped connecting member is formed integrally with the flexible arms.

4. A holder according to claim 1 and in which an arc-shaped member is integrally connected with one of the flexible arms and is loosely connected to the other flexible arm.

5. A holder according to claim 1 and in which an arc-shaped connecting member comprising a separate link is pivotally connected at its ends to the ends of the flexible arms.

6. A holder according to claim 1 and in which an arc-shaped connecting member of spring metal is connected at its ends to the ends of the flexible arms.

7. A holder according to claim 1, and in which a resilient arc-shaped member is connected by its end with the ends of the flexible arms, the flexible arms being formed respectively with a recess in one side for reception of a tool for abrading the sides of the teeth of a saw.

8. A holder according to claim 1, and in which a resilient arc-shaped member is connected by its end with the ends of the flexible arms, the flexible arms being formed respectively with a dove-tail shaped recess in one side for reception of a tool for abrading the sides of the teeth of a saw.

9. A holder according to claim 1, and in which a resilient arc-shaped member is connected at its end with the ends of the flexible arms, the flexible arms being formed respectively with a recess in one side for reception of a tool for abrading the sides of the teeth of a saw, said flexible arms also being formed respectively with a further recess for reception of a file for abrading the pointed ends of the teeth of a saw.

10. A holder according to claim 1, and in which a resilient arc-shaped member is connected by its end with the ends of the flexible arms, the flexible arms being formed respectively with a recess in one side for reception of a tool for abrading the sides of the teeth of a saw, said flexible arms each also being provided with a further recess for reception of a gauge for use in adjusting the saw-dust removing teeth of a saw blade having such teeth located alternately with the cutting teeth proper of the saw blade.

11. A holder according to claim 1 and in which the two side members extend parallel to each other.

12. A holder according to claim 1 and in which the said sheet of metal is provided with two up-turned edge portions thus forming a U-shaped element, and two side members being connected to said up-turned edge portions so that a rigid handle is thereby formed.

JOHAN MARTIN JONSSON.

REFERENCES CITED

The following references are of record in the file of this patent:

UNITED STATES PATENTS

| Number | Name | Date |
|---|---|---|
| 1,009,613 | Woolf | Nov. 21, 1911 |
| 1,538,227 | Thunborg | May 19, 1925 |